Patented Jan. 14, 1936

2,027,988

UNITED STATES PATENT OFFICE 2,027,988

PROCESS OF PREPARING ODORLESS SYNTHETIC RESINOUS PRODUCTS

Gustave E. Landt, Norristown, Pa., assignor to Continental-Diamond Fibre Company, Newark, Del., a corporation of Delaware No Drawing. Application February 16, 1934, Serial No. 711,610

4 Claims. (Cl. 260—4)

My invention relates to a process of preparing odorless synthetic resinous products, and more particularly it relates to a process of treating phenolic resins of the phenol-aldehyde type in the initial reactive stage to render them, when in the final hardened condition, free from the objectionable phenolic odor normally characteristic of such products.

Heretofore, the use of phenolic resinous products has been to some extent limited by the phenolic odor accompanying the products, which odor is particularly objectionable when the product is used as food containers, refrigerator stock and strips, and the like, due to the absorption of the odor by the food. The principal object of the present invention is to provide an economical process by which phenolic resins can be prepared, which products in their final infusible stage will be free from this odor. By the terms "free from phenolic odor", "odorless", and the like, it is to be understood that, since odor is an inherent quality in practically all substances, they are used in a relative sense to indicate products where the odor is so slight, as compared to the usual products, as not to be objectionable, particularly in connection with the storage and preservation of foods.

In accordance with the present process, the initial resinous condensation product is prepared in the usual manner by reacting the phenolic product, such as phenol, cresol or xylenol, with the other component of the resin such as an aldehydic compound or its equivalent, for example formaldehyde, furfural, a carbohydrate or glycerine. In the preparation of the initial product, a catalyst of either a basic or an acidic nature may be employed as is customary. It is desirable to use raw materials of a purity as high as, or higher than, that ordinarily employed in the manufacture of the resin in order that the final compound will not be contaminated by deleterious materials. After the reaction is complete, the initial condensation product in accordance with usual practice is distilled, preferably under vacuum, until all or substantially all of the free water has been eliminated and until the other characteristic qualities, such as viscosity, have been set at a desired point.

After the distillation step, the initial resin is reacted with a relatively small amount of a compound containing a positively charged halogen atom. The halogens themselves, which are included within this designation, may be advantageously employed since each molecule of halogen contains a positively charged atom, as well as one negatively charged. The compound may be either inorganic or organic in nature and many compounds are applicable. It will, therefore, be necessary to mention only a few of the most typical and available compounds. Of the inorganic compounds in addition to the halogens themselves, the halogen oxy-acids or salts thereof are examples; that is the hypochlorites, chlorates, and perchlorates, referring to the chlorine compounds, although it is to be understood that corresponding acids and salts of the other halogens are equally applicable. If the salts are to be employed, the sodium, potassium, or ammonium salts are to be preferred. Of the organic compounds, the initial reaction products of halogens with alcohols, aldehydes and ketones are illustrative. The nature of these initial reaction products is not definitely understood, but they appear to contain the halogen atom loosely bound in the molecule. In any event, if there is a combination between the halogen and the organic solvent, it is of such nature that the halogen functions in the process of the present invention similarly to free halogen in rendering the phenolic resin odorless in its final stage. For the purpose of the present invention, therefore, the use of halogens in alcohol, aldehydes, and ketones is included within the term "halogen".

The halogen compound may be added directly to the resin but due to the violence of the reaction and the generation of heat, it is desirable to add the compound to a solution of the initial resinous condensation product in an organic solvent, preferably alcohol. It may also be desirable to dissolve or dispense the halogen compound in a medium such as carbon tetrachloride, alcohol or acetone in order to decrease the rate of reaction. The compound containing a positively charged halogen atom may be added in amounts as low as $\frac{1}{8}\%$ by weight based on the dry weight of the resin, and $\frac{1}{4}\%$ to $1\%$ by weight gives excellent results. The amount added may be increased as desired without detriment, for example up to $5\%$ to $6\%$ by weight, but in general since the larger amounts represent a waste of material, their use is not recommended. It will be seen from the relatively small amounts of halogen compound required that the reaction probabaly is catalytic, although its exact nature has not been determined.

After the reaction with the compound containing a positively charged halogen atom is completed, the initial condensation product is manufactured into the hardened product in accordance with the usual practices employed in converting the particular resin into the final desired product. For example, the initial resin may be worked up into molding powder with the use of fillers, dyes, etc., and thereafter molded into the desired shape under heat and pressure. If desired, the solution of the resin after the reaction may be employed as a varnish for coating or impregnating fibrous sheet material such as paper and fabric, after which the resin-coated or impregnated sheets may be superposed and pressed in the usual manner between heated platens of a hydraulic press to form sheet stock or rolled on a tube machine and treated as is customary in the manufacture of tube stock.

After the product has been converted into the final, infusible, insoluble stage, it will be found to be free from phenolic odor and applicable for all uses, being particularly adapted for use in conjunction with containers and the like for the storage and/or preservation of foods.

In a typical case, 500 grams of cresol boiling between 195° C. and 220° C. and preferably between 195° C. and 210° C. are placed in a reaction kettle to which is added 550 grams of 40% formaldehyde solution and 5 grams of caustic soda. The reaction is allowed to proceed for approximately thirty minutes at atmospheric pressure and the reaction mixture is then distilled under vacuum to remove the water and the excess phenol that can thus be recovered. 100 grams of ethyl alcohol are employed to dissolve the initial resinous condensation product and to this solution 1¼ grams of bromine dissolved in 10 cubic centimeters of carbon tetrachloride are added. After the reaction is completed the resin is converted into the final, hardened condition and the desired product in accordance with usual practices.

In place of the caustic soda, other catalysts may be employed, for example an alkaline earth hydroxide up to 3% based on the cresol or ammonium hydroxide. If the last-named compound is used as a catalyst, 5% by weight based on the weight of cresol is added initially, and after the reaction has proceeded for thirty minutes, an additional 5% is added and the reaction continued for fifteen minutes thereafter.

It is also desirable to add an excess of formaldehyde, for example up to 150% of the weight of the cresol. If it is not desired to dissolve the halogen compound, such as bromine, in a solvent, it may be brought in contact with the resin by placing a glass tube into the bottom of the solution and by passing the compound through the tube.

Other variations in manipulative steps particularly in forming the resin and in introducing the compound containing the positively charged halogen atom will be apparent to those skilled in the art and are not to be considered as a departure from the present invention.

I claim:

1. The process of making an infusible, insoluble phenolic-aldehyde resinous product free from phenolic odor which comprises reacting the initial phenolic-aldehyde condensation product with a relatively small amount of a compound selected from the following group:—halogen, inorganic halogen oxy-acids, salts of inorganic halogen oxy-acids—, said compound being present in sufficient amounts to render the product free from phenolic odor in the final, infusible state, and thereafter subjecting the reaction product to heat to convert the initial product into said final product.

2. The process of claim 1 in which the compound selected is bromine.

3. The process of making an infusible, insoluble phenolic-aldehyde resinous product free from phenolic odor which comprises reacting the initial phenolic-aldehyde condensation product in an organic solvent with a relatively small amount of a compound selected from the following group: halogen, inorganic halogen oxy-acids, salts of inorganic halogen oxy-acids—, said compound being present in sufficient amounts to render the product free from phenolic odor in the final, infusible state, and thereafter subjecting the reaction product to heat to convert the initial product into said final product.

4. The process of claim 3 in which the compound selected is bromine.

GUSTAVE E. LANDT.